United States Patent
Hu et al.

(10) Patent No.: US 7,503,658 B2
(45) Date of Patent: Mar. 17, 2009

(54) PROJECTOR

(75) Inventors: Deqing Hu, Corvallis, OR (US); Terrill D. Snyder, Corvallis, OR (US); Daniel T. Pinard, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 168 days.

(21) Appl. No.: 11/039,693

(22) Filed: Jan. 20, 2005

(65) Prior Publication Data

US 2006/0158617 A1 Jul. 20, 2006

(51) Int. Cl.
  *G03B 21/14* (2006.01)
(52) U.S. Cl. .................... 353/84; 345/173; 353/121
(58) Field of Classification Search ............... 353/74, 353/101, 122, 84, 121; 345/173, 175, 176
See application file for complete search history.

(56) References Cited

U.S. PATENT DOCUMENTS

| | | | |
|---|---|---|---|
| 4,707,689 A | 11/1987 | DiPiazza et al. | |
| 4,812,830 A | 3/1989 | Doering | |
| 5,196,835 A | 3/1993 | Blue et al. | |
| 5,196,836 A | 3/1993 | Williams | |
| 5,414,413 A | 5/1995 | Tamaru et al. | |
| 5,738,429 A * | 4/1998 | Tagawa et al. | 353/122 |
| 5,764,223 A | 6/1998 | Chang et al. | |
| 5,831,601 A * | 11/1998 | Vogeley et al. | 345/175 |
| 5,914,709 A | 6/1999 | Graham et al. | |
| 6,008,800 A * | 12/1999 | Pryor | 345/173 |
| 6,351,260 B1 | 2/2002 | Graham et al. | |
| 6,366,276 B1 | 4/2002 | Kunimatsu et al. | |
| 6,478,432 B1 * | 11/2002 | Dyner | 359/858 |
| 6,480,187 B1 | 11/2002 | Sano et al. | |
| 6,492,633 B2 | 12/2002 | Nakazawa et al. | |
| 6,504,532 B1 | 1/2003 | Ogasahara et al. | |
| 6,703,999 B1 | 3/2004 | Iwanami et al. | |
| 6,762,753 B2 | 7/2004 | Satoh et al. | |
| 6,771,327 B2 | 8/2004 | Sekiguchi | |
| 7,265,370 B2 * | 9/2007 | Blythe et al. | 250/566 |
| 2001/0012001 A1 * | 8/2001 | Rekimoto et al. | 345/173 |
| 2005/0110964 A1 * | 5/2005 | Bell et al. | 353/122 |
| 2005/0187018 A1 * | 8/2005 | Takeda et al. | 463/34 |
| 2006/0007170 A1 * | 1/2006 | Wilson et al. | 345/173 |
| 2006/0109199 A1 * | 5/2006 | Yee et al. | 345/1.3 |
| 2007/0041092 A1 * | 2/2007 | Fricke et al. | 359/443 |

OTHER PUBLICATIONS

Da-Lite Screen Company, *Polacoat*, 2003, 4 pages.
Da-Lite Screen Company, Inc., *Polacoat In-Wall Rear Projection Screens*, 1 page, date unknown.
Optical Coating Laboratory, Inc., a JDS Uniphase Company, *OCLA High Performance Color Wheel Assemblies - OCLA Precision MetaMode Dichroic Color Filters in High Performance Color Wheel Assemblies*, May 2003, 2 pages.
Optical Coating Laboratory, Inc., a JDS Uniphase Company, *Application Notes - Color Wheel for Projection Display Applications*, 4 pages, May 2003.
Da-Lite Screen Company, *Polacoat*, 2003, 4 pages.

* cited by examiner

*Primary Examiner*—William C. Dowling

(57) ABSTRACT

An apparatus projects at least one color of light which is attenuated.

53 Claims, 3 Drawing Sheets

PROJECTOR

BACKGROUND

Computing systems may utilize a variety of input devices such as a keyboard, a mouse, a touch pad or a touch screen. Touch screen systems, sometimes referred as "white board technology", typically measure a single point of interaction on the screen. As a result, this may limit applications in which such touch screen systems may be used.

DETAILED DESCRIPTION OF EXAMPLE EMBODIMENTS

Figure 1:
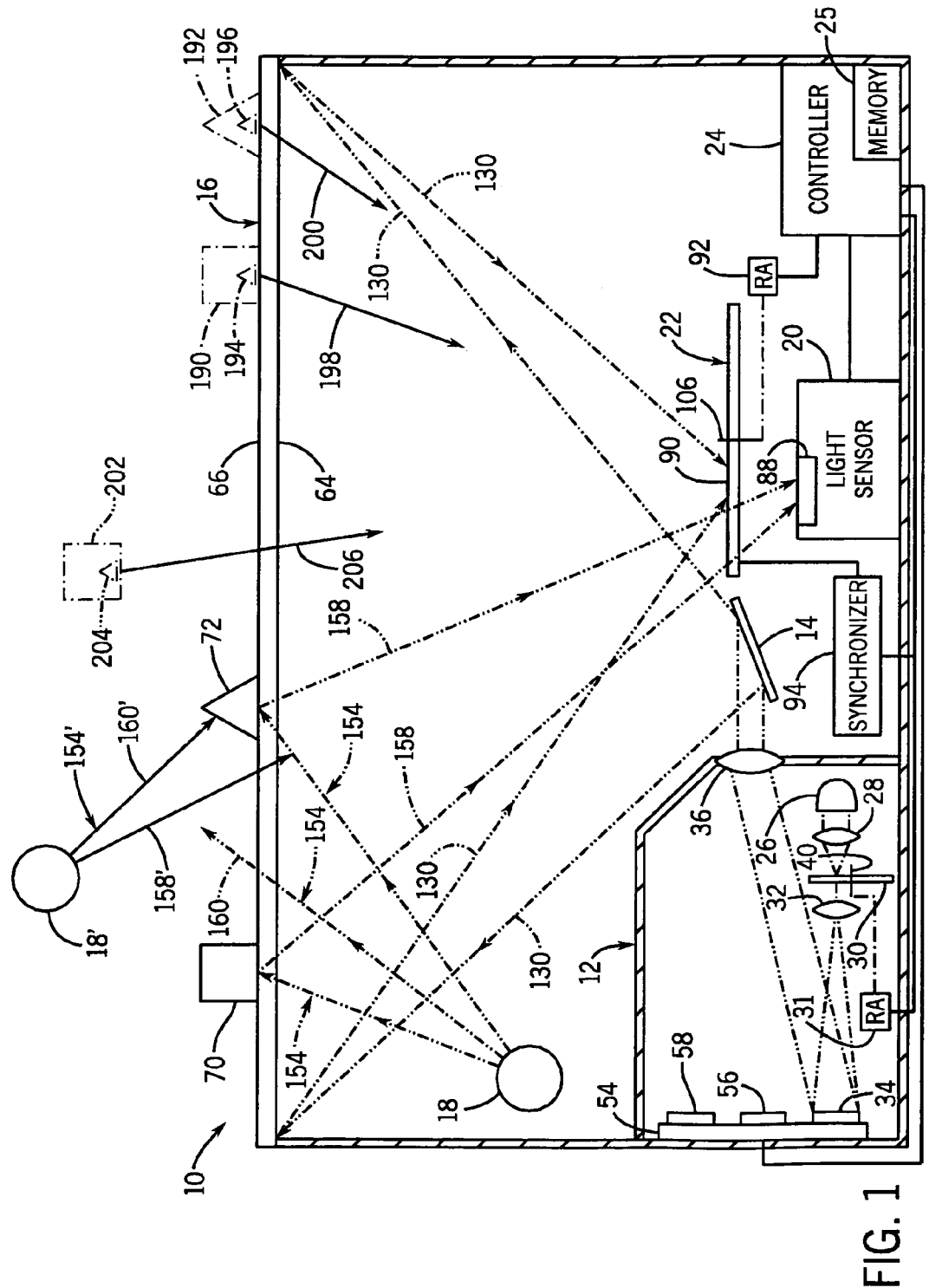
FIG. 1 is a schematic illustration of an interactive display system upon which are positioned input objects according to one exemplary embodiment.

FIG. 1 schematically illustrates an interactive display 10. Display 10 is configured to form a visual display while detecting simultaneous inputs from multiple sources such as objects, fingertips and the like. Display 10 generally includes projector 12, mirror 14, screen 16, light source 18, light sensor 20, filter system 22, rotary actuator 92, and controller 24. Projector 12 comprises a device configured to sequentially project a series of colors (light of different wavelengths) towards screen 16 so as to create an image upon screen 16. In the particular example illustrated, projector 12 comprises a digital light processing (DLP) projector which generally includes light source 26, optics 28, color wheel 30, rotary actuator 31, optics 32, digital micromirror device (DMD) 34 and projection lens 36. Light source 26 comprises a source of light such as an ultra high pressure (UHP) arc lamp and reflector configured to emit light toward optics 28. In other embodiments, other sources of light may be used such as metal halide lamps and the like. Optics 28 are generally positioned between light source 26 and color wheel 30. Optics 28 condenses the light from source 26 towards DMD 34. In one embodiment, optics 28 may comprise a light pipe positioned between light source 26 and color wheel 30.

Figures 2, 3:
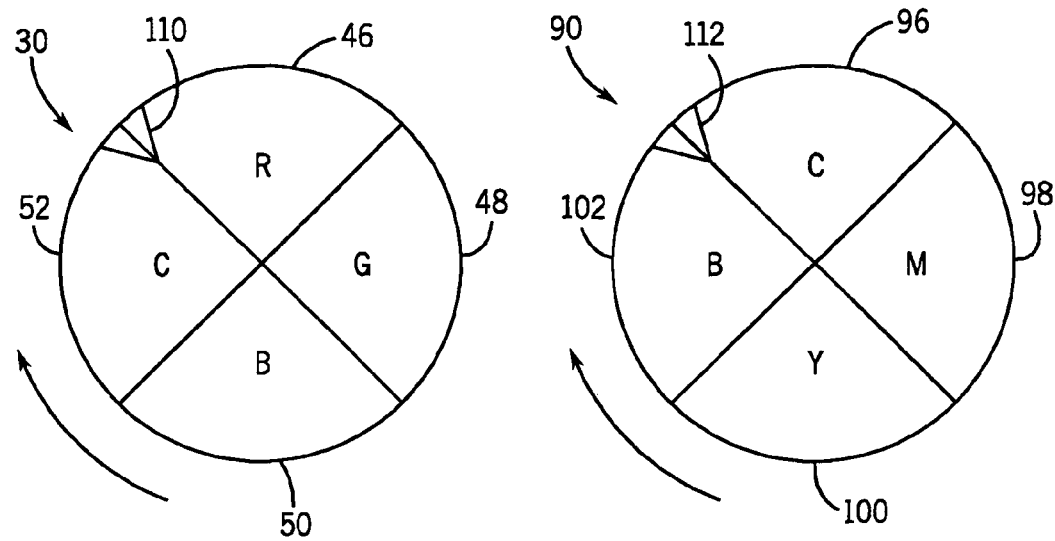
FIG. 2 is a top plan view of the color wheel of a projector of the display of FIG. 1 according to one exemplary embodiment.
FIG. 3 is a top plan view of the color wheel of a filter system of the display of FIG. 1 according to one exemplary embodiment.

Color wheel 30 comprises an optic component configured to sequentially image color. As shown by FIG. 2, color wheel 30 generally comprises a disk or other member having a plurality of distinct filter segments positioned about the rotational axis 40 of the wheel and arranged such that light from optics 28 passes through such filter segments 46, 48, 50 and 52 towards DMD 34. In one particular embodiment, color wheel 30 may include circumferentially arranged portions including red, green, blue, and clear. In another embodiment, color wheel 30 may include circumferentially arranged portions or segments corresponding to each of the three primary colors: red, green and blue. In yet another embodiment, color wheel 30 may include multiple segments of each of the primary colors. For example, color wheel 30 may include a first red segment, a first green segment, a first blue segment, a second red segment, a second green segment and a second blue segment. In still other embodiments, color wheel 30 may include other segments configured to filter light from light source 26 to create other colors.

Rotary actuator 31 comprises a device configured to rotatably drive color wheel 30 such that light from light source 26 sequentially passes through filter segments 46, 48, 50 and 52. In one embodiment, rotary actuator 31 rotates color wheel 30 at a predetermined substantially constant speed. In another embodiment, rotary actuator 31 may be configured to rotate color wheel 30 at varying speeds based upon control signals received from controller 24. In one embodiment, rotary actuator 31 includes a motor and an appropriate transmission for rotating color wheel 30 at a desired speed. In other embodiments, rotary actuator 31 may comprise other devices configured to rotatably drive color wheel 30.

Optics 32 comprises one or more lenses or mirrors configured to further focus and direct light that has passed through color wheel 30 towards DMD 34. In one embodiment, optics 32 may comprise lenses which focus and direct the light. In another embodiment, optics 32 may additionally include mirrors which re-direct light onto DMD 34.

In one embodiment, DMD 34 comprises a semiconductor chip covered with a multitude of minuscule reflectors or mirrors which may be selectively tilted between "on" positions in which light is re-directed towards lens 36 and "off" positions in which light is not directed towards lens 36. The mirrors are switched "on" and "off" at a high frequency so as to emit a gray scale image. In particular, a mirror that is switched on more frequently reflects a light gray pixel of light while the mirror that is switched off more frequently reflects darker gray pixel of light. In this context "gray scale", "light gray pixel", and "darker gray pixel" refers to the intensity of the luminance component of the light and does not limit the hue and chrominance components of the light. The "on" and "off" states of each mirror are coordinated with colored light from color wheel 30 to project a desired hue of color light towards lens 36. The human eye blends rapidly alternating flashes to see the intended hue of the particular pixel in the image being created. In the particular examples shown, DMD 34 is provided as part of a DLP board 54 which further supports a processor 56 and associated memory 58. Processor 56 and memory 58 are configured to selectively actuate the mirrors of DMD 34. In other embodiments, processor 56 and memory 58 may alternatively be provided by or associated with controller 24.

Lens 36 receives selected light from DMD 34 and projects the reflected light towards mirror 14. Mirror 14 re-directs the light towards screen 16. In other embodiments, lens 36 may alternatively be configured to direct light towards screen 16, enabling mirror 14 to be omitted. Although projector 12 is illustrated and described as a DLP projector, projector 12 may alternatively comprise other projectors having other components configured such that projector 12 sequentially projects a series of colors towards screen 16 so as to form a visual image upon screen 16.

Screen 16 comprises a component configured to receive the sequential series color wavelengths and provide a surface upon which images may be formed. Screen 16 is further configured to facilitate interaction with display 10. In the particular example shown, screen 16 comprises one or more layers of materials configured to scatter light from projector 12 such that light received from projector 12 on a first side of screen 16 may be viewed on a second opposite side of screen 16. In one embodiment, screen 16 comprises frosted glass. In one embodiment, screen 16 comprises a screen commercially available from Da-Lite Screen Company of Warsaw, Ind., under the trade name DA-100.

Screen 16 includes a first surface 64 facing projector and light sensor 20 and a second opposite surface 66 facing outward. Surface 66 is configured to facilitate interaction with display 10. In the particular example shown, surface 66 is supported and arranged in a substantially horizontal orientation, enabling objects, such as objects 70 and 72 to rest upon surface 66. In the particular example shown, surface 66 is also configured to be touched by one or more users fingers or other devices for inputting information or interacting with display 10.

Although surface 66 and screen 16 are illustrated as being substantially horizontal, surface 66 may alternatively be supported at other orientations. For example, surface 66 may alternatively be inclined, declined or vertical. In other embodiments, surface 66 may be convex or concave. Although surfaces 66 and 64 are illustrated as being substantially parallel to one another, surfaces 66 and 64 may alternatively have other shapes or configurations. Although screen 16 is illustrated as being positioned between objects 70, 72 and projector 12, in other embodiments, screen 16 may alternatively be arranged such that projector 12 projects light onto surface 66 with objects 70, 72 supported between surface 66 and projector 12.

Light source 18 comprises an illumination source configured to emit or project light 154 towards surface 66 of screen 16. In one embodiment, light source 18 is configured to project white light. In other embodiments, light source 18 may be configured to project light having other wavelengths. In one embodiment, light source 18 is configured to emit light over an entire area of surface 66 of screen 16. In another embodiment, light source 18 may alternatively be configured to scan light across surface 66 of screen 16 over a preselected period of time. Light 154 emitted by light source 18 is reflected by objects or surfaces along surface 66. In the example illustrated, light emitted from light source 18 either passes through surface 66 (portion 160) or is reflected off of the surfaces in contact with surface 66 such as objects 70, 72 or a person's fingertips (portion 158) and is sensed by light sensor 20.

Although light source 18 is illustrated as being located between light sensor 20 and screen 16, light source 18 may be provided in other locations in other embodiments. For example, in another embodiment, display system 10 may alternatively or additionally include light source 18' located such that screen 16 and input objects resting upon screen 16 are between light source 18' and light sensor 20. In such an embodiment, light source 18' is configured to emit or project light 154' towards surface 66 of screen 16. A first portion 158' of light 154' is not obstructed by any input objects resting upon screen 16 and passes through screen 16 towards light sensor 20. A second portion 160' of light 154' is obstructed by one or more input objects upon screen 16 and is not received by light sensor 20. In the particular example shown in FIG. 1, the blockage of light 160' by input object 72 forms a darkened area or shadow that may be sensed by light sensor 20 and used by controller 24 to identify the position, identity or other properties of input object 72. In some embodiments, light source 18' may be provided by sources of ambient light where display system 10 is located. In some embodiments, light source 18 may be replaced with light source 18' or light sources 18 and 18' may be utilized together to supplement one another.

Light sensor 20 generally comprises a device configured to receive light through an aperture 88 and to sense the characteristics of light. In the particular example shown, light sensor 20 is configured to sense the characteristic of light 158 reflected from objects on surfaces proximate to screen 16. Based upon the sensed light, light sensor 20 generates electrical signals which are communicated to controller 24. In one embodiment, light sensor 20 comprises a digital camera. In other embodiments, light sensor 20 may comprise other light sensitive devices.

Filter system 22 comprises one or more filters configured to attenuate a series of color wavelengths projected by projector 12 prior to the series of color wavelengths being received or sensed by light sensor 20. At the same time, filter system 22 is configured to permit at least a portion of light from light source 18, including light from light source 18 that is reflected off of objects or surfaces adjacent to surface 66 to be received by light sensor 20. As a result, filter system 22 enables light sensor 20 to extract information in the form of light from light source 18 that is reflected off of an input surface such as surfaces of objects 70, 72 or fingertips, or passes through screen 16 from light source 18', while substantially excluding color wavelengths projected by projector 12. By filtering out other extraneous information, such as light from projector 12 that is used to form an image upon screen 16, filter system 22 enables controller 24 to more easily capture input information.

In the particular example shown, filter system 22 includes color wheel 90, rotary actuator 92 and synchronizer 94. FIG. 3 illustrates color wheel 90 in greater detail. As shown by FIG. 3, color wheel 90 is similar to color wheel 30. According to one embodiment, color wheel 90 is an opto-mechanical assembly containing multiple pieces of dichroic-coated glass arranged in arc segments that are rotated. Color wheel 90 includes an equal number of segments to that of color wheel 30. Each of the segments of color wheel 90 is configured to attenuate the color wavelength of light projected from projector 12 as a result of light from light source 26 passing through the corresponding one of segments 46, 48, 50 and 52 of color wheel 30. In the particular example shown in which color wheel 30 includes a red segment 46, a green segment 48, a blue segment 50 and a clear segment 52, color wheel 90 includes a cyan segment 96, a magenta segment 98, a yellow segment 100 and a black segment 102.

In other embodiments, color wheel 90 may have other arrangements of color filter segments depending upon the configuration of color wheel 30 of projector 12. For example, if color wheel 30 alternatively has three segments: red, green and blue, color wheel 90 has a corresponding three segments: cyan, magenta and yellow. In another embodiment in which color wheel has six segments: red, green, blue, red, green, blue, color wheel 90 may have six segments: cyan, magenta, yellow, cyan, magenta, yellow. In still other embodiments, color wheel 30 may have other color segments and color wheel 90 may have associated color segments configured to attenuate color wavelengths resulting from light passing through the corresponding segments of color wheel 30. For example, color wheel 30 may alternatively have four segments: cyan, magenta, yellow and clear while color wheel 90 has four segments: red, green, blue and black.

Rotary actuator 92 comprises a device configured to rotatably drive color wheel 90 about axis 106. In one embodiment, rotary actuator 92 rotates color wheel 90 at a predetermined substantially constant speed. In another embodiment, rotary actuator 92 may be configured to rotate color wheel 90 at varying speeds based upon control signals received from controller 24. In one embodiment, rotary actuator 92 includes a motor and an appropriate transmission for rotating color wheel 90 at a desired speed. In other embodiments, rotary actuator 92 may comprise other devices configured to rotatably drive color wheel 90.

Synchronizer 94 comprises a mechanism configured to synchronize the rotation of color wheels 30 and 90. In other words, synchronizer 94 facilitates rotation of wheels 30 and 90 at substantially identical speeds and maintains substantial alignment of negative color wheel segments 96, 98, 100, 102 of color wheel 90 with their corresponding color wheel segments 46, 48, 50 and 52, respectively, of color wheel 30.

In the particular example shown, color wheels 30 and 90 include encoder marks 110 and 112, respectively. Marks 110 and 112 are configured to be read by synchronizer 94 which generates and communicates signals to controller 24. Based upon such signals from synchronizer 94, controller 24 generates control signals which are transmitted to one or more rotary actuators, such as motors, clutches and transmissions (not shown), to maintain or adjust the rate at which color wheels 30 and 90 are being rotatably driven to align the color segments of color wheel 90 with their corresponding color segments of color wheel 30. In one embodiment, synchronizer 94 comprises an optical photo detector having a light emitter on a first side of each of color wheels 30, 90 and optical light sensitive receiver on an opposite side of color wheels 90, 30 such that the location of marks 110, 112 may be sensed or detected by sensing light passing through one or more openings at marks 110, 112. In other embodiments, synchronizer 94 may include other sensing devices.

Controller 24 comprises one or more processing units configured to generate control signals for directing the operation of one or more of projector 12, light source 18, sensor 20, and filter system 22. Controller 24 is further configured to process or analyze signal information received from light sensor 20. For purposes of this disclosure, the term "processor unit" shall mean a presently available or future developed processing unit that executes sequences of instructions contained in a memory 25. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. Controller 24 is not limited to any specific combination of hardware circuitry and software, nor to any particular source for the instructions executed by the processing unit.

Figure 4:
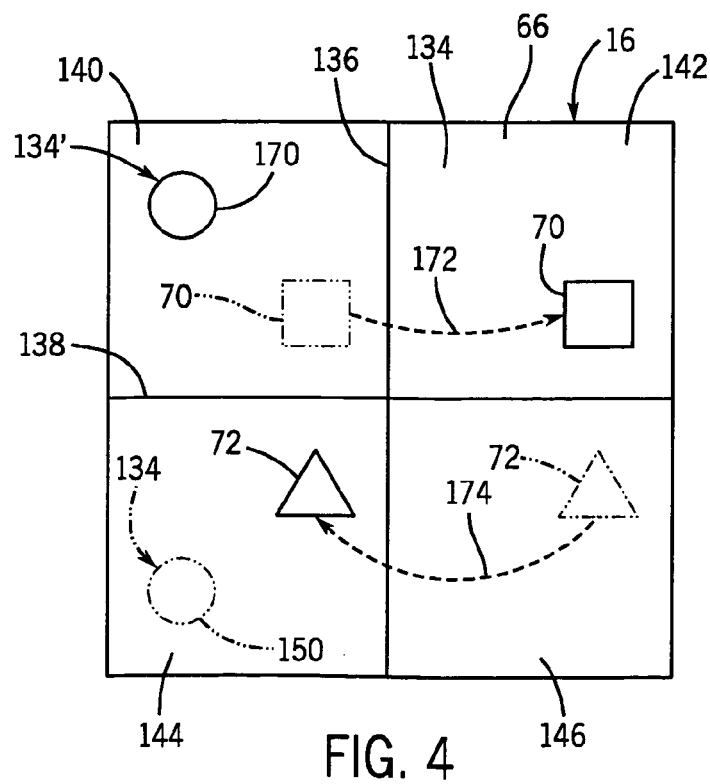
FIG. 4 is a top plan view of the display of FIG. 1 illustrating display images and positioning of input objects at distinct moments in time according to one exemplary embodiment.

FIGS. 1 and 4 illustrate an example scenario operation of interactive display device 10. In particular, FIG. 4 illustrates one example of screen 16 at first and second moments in time as indicated by phantom and solid illustrations, respectively. As shown by FIG. 1, at the first moment in time, projector 12 projects light 130 off of mirror 14 onto screen 16. Light 130 is scattered by screen 16 and forms a display image 134 (shown in FIG. 4). In the particular example shown in FIG. 4, display image 134 includes lines 136, 138 which partition the screen into quadrants 140, 142, 144 and 146. Display image 134 further includes character 150 in quadrant 144. Lines 136, 138 and character 150 of display image 134 may be a single color or multiple distinct colors.

FIG. 4 further illustrates objects 70 and 72 positioned and resting upon surface 66 of screen 16. In particular, at the first moment in time, object 70 is positioned within quadrant 140 while object 72 is positioned within quadrant 146. At the same time that projector 16 is forming display image 134, controller 24 is detecting the positioning of input objects 70 and 72. In particular, as shown by FIG. 1, light source 18 is emitting light 154 towards screen 16 and towards objects 70 and 72. Although FIG. 1 illustrates light 154 as being emitted directly towards screen 16 and objects 70, 72, light 154 provided by light source 18 may alternatively be reflected off one or more intermediate mirrors (not shown) or may be managed by one or more intermediate optic devices, such as lenses, prior to reaching screen 16 or objects 70, 72. Portion 158 of light 154 reflects off of objects 70 and 72 while another portion 160 passes through screen 16. In other embodiments, portion 160 may alternatively be absorbed or dispersed by screen 16 without being reflected towards light sensor 20.

As further shown by FIG. 1, light 158 is reflected towards light sensor 20. Light 158 passes through segments 96, 98, 100 and 102 of color wheel 90 so as to be received by light sensor 20. In one particular embodiment in which light sensor 20 comprises a camera, light sensor 20 receives the light so as to take an instantaneous snapshot of the positioning of objects 70 and 72. Light sensor 20 further generates signals representing or otherwise indicating the addition, removal, position, identity, or other properties of objects 70 and 72 and transmits such signals to controller 24. Controller 24 temporarily stores such signals or other data values based upon such signals in memory 25.

During projection of display image 134, projector 12, light 130 may also reflect off of screen 16 towards light sensor 20. However, such light 130 is attenuated by filter system 22 prior to being received by light sensor 20. As a result, light sensor 20 receives light 158 reflected off of objects 70, 72 representing the position of objects 70, 72 without receiving substantial extraneous input resulting from light 130 reflecting off of screen 16. Consequently, as will be described in greater detail hereafter, controller 26 may more easily compare data based upon signals from light sensor 20 at distinct moments in time to identify or detect input such as movement of multiple input sources such as objects, fingertips and the like on screen 16, placement of new objects on screen 16, or removal of certain objects from screen 16.

In the particular example illustrated, filter system 22 attenuates light 130 reflected from screen 16 or from other surfaces adjacent to screen 16 by filtering out at least part of reflected light 130 while permitting at least a portion of light 158 (i.e. at least some wavelength of light) to pass through wheel 190 to light sensor 20. In particular, synchronizer 92 and controller 24 cooperate to align and rotate in unison filter segments 46, 48, 50 and 52 with their corresponding "negative" segments 96, 98, 100 and 102, respectively, of color wheel 90. As a result, light projected by projector 12 is filtered by filter system 22. For example, when light 130 is passing through segment 46 such that light 130 is red, cyan filter segment 96 is positioned across the light receiving aperture 88 of light sensor 20 so as to attenuate red light. Likewise, when light 130 has passed through filter segment 50 of color wheel 30 such that light 130 is blue, the yellow filter segment 100 of color wheel 90 is positioned across the light-receiving aperture 88 of light sensor 20 so as to attenuate reflected light 130 before it reaches light sensor 20.

FIG. 4 further illustrates screen 16 at a second moment in time as indicated by solid lines. In particular, at least one of controller 24 and controller 58 (shown in FIG. 1) generate control signals directing and controlling the rotation of color wheel 30 and the actuation of DMD 34 to project light 130 so as to alternatively form display image 134'. Display image 134' is similar to display image 134 except that display image 134' includes character 170 in lieu of character 150. Like display image 134, display image 134', at the second moment in time, includes quadrant lines 136 and 138.

As further shown by FIG. 4, at the second moment in time, input objects 70 and 72 have been moved, as indicated by arrows 172, 174, to quadrants 142 and 144, respectively. Light sensor 20 and controller 24 detect this repositioning of input objects 70 and 72. In particular, at the second moment in time, light source 18 emits light 154 which is reflected off of objects 70 and 72 at their new positions. The reflected light 158 passes through color wheel 90 and is received by light sensor 20. Light sensor 20 generates signals (electrical, optical and the like) representing the new positions of objects 70 and 72 and transmits such signals to controller 24. Controller 24 receives such signals representing the new positions of input objects 70 and 72 and may store data based upon such signals in memory associated with controller 24. Stored data represents a snapshot of the positioning of input objects 70 and 72 on screen 16 at the second moment in time. Controller 24 may then compare the snapshot or data representing the position of objects 70, 72 at the first moment in time with the positioning of objects 70, 72 at the second moment in time to extract input information (the movement of objects 70, 72). As discussed above, filter system 22 attenuates light 130 from projector 12 which is reflected from screen 16 prior to such light reaching the light-receiving portion of light sensor 20. Because the data compared is simplified in that it may not include extraneous information such as light 130 reflected from screen 16, controller 24 may more easily compare data from both moments in time, potentially reducing the computing power and time for the comparison.

FIG. 4 illustrates but one example of a display image 134 and input objects 70, 72. In other embodiments, display image 134 may have a variety of sizes, shapes, configurations and colors. In lieu of objects 70, 72, input may be from any surface proximate to surface 66 from which light from light source 18 may be reflected. For example, less than two or greater than two input objects may be used. A fingertip or touch of one or more persons may also be used to input information to display 10. In some embodiments, input objects, such as objects 190, 192 (shown in phantom in FIG. 1), may additionally include light emitters 194 and 196 configured to emit light 198 and 200, respectively, through screen 16 towards light sensor 20 when placed upon screen 16. In such an embodiment, light source 18 may be omitted, wherein light sensor 20 receives and senses the light emitted from each of the input objects 190, 192 resting upon screen 16 rather than light from light source 18 being reflected off of input objects 70, 72. In some embodiments, input objects that emit light but do not rest upon screen 16 may be used to input information to display 10. For example, FIG. 1 additionally illustrates input object 202 having a light emitter 204 (shown in phantom) configured to emit a light, such as a laser or other beam of light 206 through screen 16 towards light sensor 20. In such an embodiment, input object 202 may or may not touch surface 66 of screen 16. One example of such an input object 202 is a light pen or laser pointer.

Figure 5:
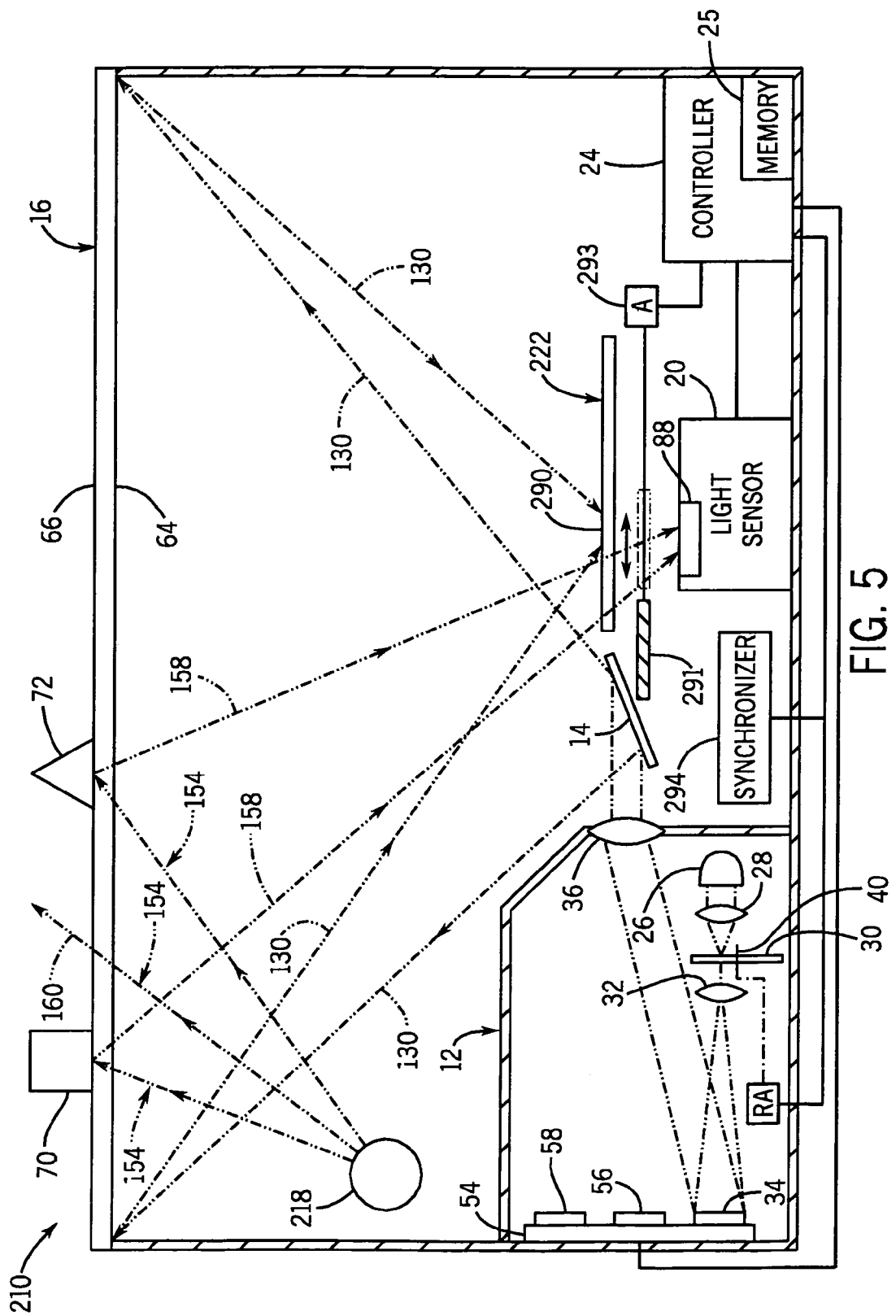
FIG. 5 is a schematic illustration of another embodiment of the display system of FIG. 1 according to one exemplary embodiment.

FIG. 5 schematically illustrates interactive display 210, another embodiment of interactive display 10. Interactive display 210 is similar to interactive display 10 except that interactive display 210 includes filter system 222 in lieu of filter system 22 and light source 218 in lieu of light source 18. Those remaining components of interactive display 210 which substantially correspond to the components of display 10 are numbered similarly. Filter system 222 comprises one or more filters configured to attenuate at least one color or light within a particular wavelength range projected by projector 12 prior to the at least one color being received or sensed by light sensor 20. At the same time, filter system 222 is configured to permit light from light source 218 that is reflected off of surfaces or objects proximate surface 66 of screen 16 (or light directly from objects on screen 16) to pass through to light sensor 20. As a result, filter system 222 enables light sensor 20 to extract information in the form of light reflected off or emitted from input surfaces along screen 16 while substantially excluding light from projector 12. By attenuating extraneous information, such as light from projector 12 that is used to form an image upon screen 16, filter system 222 enables controller 24 to more easily capture and compare input information.

Filter system 222 generally includes wavelength filter 290, shutter 291, actuator 293 and synchronizer 294. Wavelength filter 290 generally comprises an optical filter having a defined short wavelength cut-off and/or long wavelength cut-off. Band pass filter 290 is configured to block or attenuate the wavelengths of light outside of a predefined range of wavelengths. For example, in one embodiment, band pass filter 290 may be configured to permit blue light to pass through filter 290 while substantially attenuating other wavelengths. In the particular embodiment shown, filter 290 is stationarily positioned proximate to receiving aperture 88 of light sensor 20 such that light received by receiving aperture 88 of light sensor 20 passes through filter 290. In other embodiments, filter 290 may be movably or removably positioned relative to receiving aperture 88 of light sensor 20.

Shutter 291 comprises a device configured to selectively block light from receiving aperture 88 of light sensor 20. In the particular embodiment shown, shutter 291 comprises one or more substantially opaque structures which are movable between a closed position (shown in phantom) in which structures block light from being received from passing through receiving aperture 88 of light sensor 20 and an opened position (shown in solid). In the particular example shown, shutter 291 is actuated between the open position and the closed position by an actuator 293 which operates in response to control signals from controller 24.

Although shutter 291 is illustrated as being located between receiving aperture 88 of light sensor 20 and filter 290, filter 290 may alternatively be positioned between receiving aperture 88 of light sensor 20 and shutter 291. Although shutter 291 is illustrated as a physical structure linearly moved between the open and closed positions, shutter 291 may alternatively pivot or rotate between open and closed positions or states. Moreover, although 291 is illustrated as a physical structure that moves between the open and closed positions, shutter 291 may alternatively comprise other structures such as one or more cells containing liquid crystals which may be selectively controlled by the application of voltage to block light or to permit light to pass therethrough. In one embodiment in which light sensor 20 comprises a camera, shutter 291 simply comprises a shutter already incorporated into the camera as a controlled time window.

Synchronizer 294 generally comprises a device configured to facilitate synchronization of the positioning of shutter 291 with the positioning of color wheel 30. In one embodiment, synchronizer 294 comprises an optical photo detector having a light emitter on a first side of color wheel and an optical light sensitive receiver on an opposite side of color wheel 30 such that the location of mark 110 (shown in FIG. 2) may be sensed or detected by sensing light passing through the openings at mark 110. Synchronizer 294 generates and communicates signals to controller 24 representing or indicating the positions of one or more segments 46, 48, 50 and 52 of color wheel 30. Based upon such signals, controller 24 generates control signals directing actuator 293 to move or otherwise actuator shutter 291 between the open and closed positions or states.

Light source 218 is similar to light source 18 except that light source 218 is specifically configured to emit or project light having at least one wavelength that passes through filter 290 of filter system 222. For example, if filter 290 is specifically configured to attenuate blue light, light source 18 may comprise a source of white light, red light, green light and the like.

In operation, controller 24 generates control signals based upon the detected position of color wheel 30 (derived from the signals received from synchronizer 294) so as to move, retain or otherwise actuate shutter 291 to the open position or state during the time period in which filter 290 is attenuating light 130 from projector 12. At other times, controller 24 is generating control signals directing actuator 293 to move or retain shutter 291 to the closed position or state. For example, in one embodiment, filter 290 may be specifically configured to attenuate blue colored light. In such an embodiment, controller 24 generates control signals directing actuator 293 to move shutter 291 to the open position when light from light source 26 is passing through the blue color filter segment 50 of color wheel 30 and when the resulting blue light is being projected by projector 12. As a result, filter 290 attenuates blue light 130 reflected off of screen 16 prior to such light reaching light sensor 20. At the same time, filter 290 will not substantially attenuate reflected light 158 from light source 218 or will attenuate a portion of light 158 (blue wavelengths in the example) while allowing other wavelengths to pass through without substantial attenuation. The remaining reflected light 158 will continue past shutter 291 (in the open position) to light sensor 20. As a result, light sensor 20 will receive reflected light 158 or at least portions of reflected light 158 and will not receive a substantial amount of light 130 projected by projector 12. Thus, as with the operation of display 10, the operation of display 210 enables the positioning, identity or other properties of objects or other surfaces along screen 16 to be detected without substantial extraneous input such as light 130, enabling controller 24 to detect simultaneous inputs from multiple sources at distinct moments in time with less processing power and in less time.

In one embodiment, light source 218 may be strobed to shutter 291 such that light source 218 emits or projects light 154 when shutter 291 is in an open position. For example, in one embodiment, controller 24 may be configured to generate control signals such that light source 218 emits light 154 at the same time or shortly after the time at which controller 24 generates control signals directing actuator 293 to move shutter 291 to the open position. In one other embodiment, controller 24 may alternatively be configured to generate control signals such that light sensor 20 captures light 154 and transmits signals to controller 24 during those periods of time in which filter 290 is attenuating substantially all of the light from being projected by projector 12 and not during other periods of time. For example, in one embodiment, filter 290 may be configured to attenuate light having a blue wavelength. In such an embodiment, controller 24 may be configured to direct light sensor 20 to capture images and transmit signals representing the captured images to controller 24 during those periods of time when blue light is being projected by projector 12 (i.e., when light from light source 26 is passing through blue color filter segment 50 of color wheel 30) and not during other periods of time. In such an embodiment, shutter 291 and actuator 293 may be omitted.

Like interactive display system 10, interactive display system 210 facilitates the detection of simultaneous inputs from multiple sources such as objects, fingertips and the like while potentially reducing processing power and processing time for comparing the positioning of objects or other surfaces or distinct points in time by image subtraction. In addition, display system 210 may be less expensive and less complex as compared to display system 10 in that filter system 222 which is a stationary filter 290 may not be rotated or synchronized with color wheel 30 of projector 12. In particular embodiments, shutter 291 and actuator 293 may be omitted in their entirety as discussed above. Overall, display system 210 may be less complex and less expensive.

FIGS. 1 and 5 illustrate example embodiments of display systems 10 and 210. Features described with regard to system 10 may be employed in display system 210 and vice-versa. For example, input objects 190, 192 and 202 may also be utilized in display system 210. Light source 218 in display system 210 may be replaced or supplemented by light source 18' as described with respect to display system 10.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An apparatus comprising:
    a projector configured to sequentially project colors of light;
    a light sensitive device;
    a filter configured to attenuate at least one of the colors before a portion of the light impinges upon the light sensitive device;
    a screen configured to be illuminated by the colors; and
    a light source configured to project visible light towards the screen, wherein the light sensitive device is configured to receive light during projection of said one of the colors and not during projection of a remainder of the colors.

2. The apparatus of claim 1, wherein the light source and the light sensitive device are on a common side of the screen.

3. The apparatus of claim 1, wherein the screen is between the light source and the light sensitive device.

4. The apparatus of claim 1, wherein the light source, the screen and the light sensitive device are arranged such that the light sensitive device receives light from the light source after it has been reflected off of a surface upon the screen.

5. The apparatus of claim 1, wherein the screen is substantially horizontal.

6. The apparatus of claim 1, wherein the screen is configured to scatter light.

7. The apparatus of claim 1, wherein the filter is configured to filter out a plurality of the colors.

8. The apparatus of claim 1, wherein the filter is configured to filter out each of the colors.

9. The apparatus of claim 1, wherein the light sensitive device includes a shutter configured to permit the light sensitive device to receive light during projection of said one of the colors and not during projection of the remainder of the colors.

10. The apparatus of claim 9, wherein the filter comprises a wavelength filter.

11. The apparatus of claim 10 further comprising a light source strobed to the shutter.

12. The apparatus of claim 1, wherein the filter includes a color wheel comprised of colored segments.

13. The apparatus of claim 1, wherein the projector includes a first color wheel and wherein the filter includes a second color wheel.

14. The apparatus of claim 13, wherein the second color wheel is synchronized with the first color wheel to filter the colors projected by the projector.

15. The apparatus of claim 13 further comprising a synchronizer coupled between the first color wheel and the second color wheel.

16. The apparatus of claim 1, wherein the light sensitive device includes a camera.

17. The apparatus of claim 1 further comprising a processor in communication with the light sensitive device, wherein the processor is configured to detect and compare first signals from the light sensitive device at a first time to second signals from the light sensitive device at a second time.

18. The apparatus of claim 1 further comprising:
a screen configured to be illuminated by the colors;
a light source configured to project light towards the screen; and
a processor in communication with the light sensitive device, wherein the processor is configured to detect and compare first signals from the light sensitive device based upon reflected light from the light source at a first time to second signals from the light sensitive device based upon the reflected light from the light source at a second time.

19. The apparatus of claim 18, wherein the first signals from the light sensitive device are based upon the reflected light of the light source reflected from multiple first and second surfaces of first and second objects located at first and second positions, respectively, adjacent the screen and wherein the second signals from the light sensitive device are based upon the reflected light of the light source reflected from the first and second surfaces at third and fourth different positions, respectively.

20. The apparatus of claim 1 further comprising:
a screen configured to be illuminated by the colors;
a light source configured to project light towards the screen; and
a processor in communication with the light sensitive device, wherein the processor is configured to detect and compare signals from the light sensitive device based upon the light from the light source that is passed through the screen without being blocked at a first time to second signals from the light sensitive device based upon the light from the light source that is passed through the screen without being blocked at a second time.

21. The apparatus of claim 1 further comprising:
a controller in communication with the light sensitive device and the projector, wherein the controller is configured to generate control signals actuating the light sensitive device during projection of said one of the colors and unactuating the light sensitive device during projection of another of the colors.

22. The apparatus of claim 1 further comprising:
a screen configured to be illuminated by the colors; and
a first object configured to rest upon the screen.

23. The apparatus of claim 22, further comprising a second object configured to rest upon the screen.

24. The apparatus of claim 22, wherein the first object includes a light source.

25. The apparatus of claim 1 further comprising:
an object including a light emitter configured to emit a focused beam of light at the light sensitive device.

26. The apparatus of claim 1, wherein the filter is configured to permit at least portions of visible ambient light to pass to the light sensitive device and wherein the light sensitive device is configured to sense shadows resulting from blocked ambient light.

27. The apparatus of claim 1, wherein the light sensitive device includes a receiving aperture and wherein the apparatus further comprises a shutter actuatable between a first state in which the shutter blocks light from the receiving aperture and a second state in which light is permitted to pass through the shutter towards the aperture.

28. The apparatus of claim 27, wherein actuation of the shutter is strobed with the light source.

29. A method comprising:
projecting a first light of at least one color through a rotating color wheel towards a screen, wherein the projecting the first light includes projecting light in a sequential series of colors;
projecting a second visible light towards the screen;
synchronously rotating a second color wheel, through which at least a portion of the second light passes, with the first color wheel;
attenuating the first light; and
sensing the second light.

30. The method of claim 29, wherein the attenuating the first light includes filtering out the at least one color of the first light.

31. The method of claim 29 further comprising reflecting the second light off an object on the screen prior to being sensed.

32. The method of claim 29 further comprising transmitting the second light past an object on the screen prior to the second light being sensed.

33. The method of claim 29, wherein the second light is emitted by an object adjacent the screen.

34. The method of claim 29, wherein the second light is emitted by a handheld object spaced from the screen.

35. The method of claim 29, wherein sensing the second light includes sensing the second light at a first time to produce a first signal and sensing the second light at a second time to produce a second signal and wherein the method further includes comparing the first signal and the second signal.

36. The method of claim 29 further comprising:
positioning a first surface and a second surface adjacent the screen at first and second positions, respectively, while the first light forms a first image on the screen, wherein sensing the second light includes sensing the second light after it has been reflected off of the first surface at the first position and off of the second surface at the second position to create a first signal;
repositioning the first surface to a third position adjacent the screen while the first light forms a second image on the screen, wherein sensing the second light further includes sensing the second light after the second light has been reflected off of the first surface at the third position to produce a second signal; and
comparing the first signal and the second signal.

37. The method of claim 29 further comprising:
  positioning a first surface and a second surface adjacent the screen at first and second positions, respectively, while the first light forms a first image on the screen, wherein sensing the second light includes sensing the second light after it has passed the first surface at the first position and past the second surface at the second position to create a first signal;
  repositioning the first surface to a third position adjacent the screen while the first light forms a second image on the screen, wherein sensing the second light further includes sensing the second light after the second light has passed the first surface at the third position to produce a second signal; and
  comparing the first signal and the second signal.

38. The method of claim 29, wherein the projecting the second visible light and the sensing the second light are on a common side of the screen.

39. A method comprising:
  projecting a first light of at least one color towards a screen;
  projecting a second light towards the screen;
  attenuating the first light;
  sensing the second light; and
  positioning a first surface and a second surface adjacent the screen at first and second positions, respectively, while the first light forms a first image on the screen, wherein sensing the second light includes sensing the second light after it has been reflected off of the first surface at the first position and off of the second surface at the second position to create a first signal;
  repositioning the first surface to a third position adjacent the screen while the first light forms a second image on the screen, wherein sensing the second light further includes sensing the second light after the second light has been reflected off of the first surface at the third position to produce a second signal; and
  comparing the first signal and the second signal.

40. The method of claim 39, wherein the projecting a first light includes projecting light in a sequential series of colors, wherein the second light is sensed only during projection of one of the colors and wherein only said one of the colors of the first light is attenuated.

41. The method of claim 40, wherein the second light is sensed with a light sensitive device and wherein the method further includes blocking the light sensitive device from the first light during projection of the one color.

42. The method of claim 41, wherein projecting the first light includes directing light through a rotating color wheel and wherein blocking the light sensitive device includes synchronizing a shutter proximate the light sensitive device with a rotation of the color wheel.

43. The method of claim 39, wherein the projecting a first light includes projecting light in a sequential series of colors, wherein each of the colors is prevented from being sensed.

44. A computer-readable medium comprising:
  stored instructions to attenuate a first light projected towards a screen;
  stored instructions to sense a second light projected towards a screen; and
  stored instructions to synchronize the positioning of a color filter relative to a light sensitive device with respect to a color wheel through which the first light passes.

45. The computer-readable medium of claim 44 further comprising:
  stored instructions to compare the second light sensed at a first time with the second light sensed at a second time.

46. The computer-readable medium of claim 44 further comprising:
  stored instructions to synchronize rotation of a first color wheel through which the first light is projected with rotation of a second color filter wheel through which at least a portion of the second light passes.

47. A system comprising:
  a screen;
  a projector configured to sequentially project colors of light towards the screen, wherein the projector comprises a first color wheel;
  a light sensitive device; and
  a filter configured to attenuate at least one of the colors before a portion of the light impinges upon the light sensitive device, wherein the filter comprises a second color wheel; and
  a synchronizer configured to synchronize rotation of the first color wheel and the second color wheel.

48. The system of claim 47 further comprising a controller configured to compare signals from the light sensitive device at a first time with signals from the light sensitive device at a second time.

49. An apparatus comprising:
  a projector configured to sequentially project colors of light;
  a light sensitive device; and
  a filter configured to attenuate at least one of the colors before a portion of the light impinges upon the light sensitive device, wherein the light sensitive device is configured to receive light during projection of said one of the colors and not during projection of a remainder of the colors.

50. An apparatus comprising:
  a projector configured to sequentially project colors of light;
  a light sensitive device; and
  a filter configured to attenuate at least one of the colors before a portion of the light impinges upon the light sensitive device, wherein the filter is synchronized with the projector to filter the colors projected by the projector.

51. An apparatus comprising:
  a projector configured to sequentially project colors of light;
  a light sensitive device;
  a filter configured to attenuate at least one of the colors before a portion of the light impinges upon the light sensitive device;
  a screen configured to be illuminated by the colors;
  a light source configured to project light towards the screen; and
  a processor in communication with the light sensitive device, wherein the processor is configured to detect and compare signals from the light sensitive device based upon the light from the light source that is passed through the screen without being blocked at a first time to second signals from the light sensitive device based upon the light from the light source that is passed through the screen without being blocked at a second time.

52. The apparatus comprising:
  a projector configured to sequentially project colors of light;
  a light sensitive device;
  a filter configured to attenuate at least one of the colors before a portion of the light impinges upon the light sensitive device;

a screen configured to be illuminated by the colors; and a light source configured to project visible light towards the screen;

a screen configured to be illuminated by the colors;

a light source configured to project light towards the screen; and a processor in communication with the light sensitive device, wherein the processor is configured to detect and compare first signals from the light sensitive device based upon reflected light from the light source at a first time to second signals from the light sensitive device based upon the reflected light from the light source at a second time, wherein the first signals from the light sensitive device are based upon the reflected light of the light source reflected from multiple first and second surfaces of first and second objects located at first and second positions, respectively, adjacent the screen and wherein the second signals from the light sensitive device are based upon the reflected light of the light source reflected from the first and second surfaces at third and fourth different positions, respectively.

53. An apparatus comprising:

a projector configured to sequentially project colors of light;

a light sensitive device;

a filter configured to attenuate at least one of the colors before a portion of the light impinges upon the light sensitive device;

a screen configured to be illuminated by the colors;

a light source configured to project visible light towards the screen; and a controller in communication with the light sensitive device and the projector, wherein the controller is configured to generate control signals actuating the light sensitive device during projection of said one of the colors and unactuating the light sensitive device during projection of another of the colors.

* * * * *

UNITED STATES PATENT AND TRADEMARK OFFICE
CERTIFICATE OF CORRECTION

PATENT NO. : 7,503,658 B2
APPLICATION NO. : 11/039693
DATED : March 17, 2009
INVENTOR(S) : Deqing Hu et al.

Page 1 of 1

It is certified that error appears in the above-identified patent and that said Letters Patent is hereby corrected as shown below:

In column 14, line 61, in Claim 52, delete "The" and insert -- An --, therefor.

Signed and Sealed this
Thirty-first Day of May, 2011

David J. Kappos
*Director of the United States Patent and Trademark Office*